United States Patent [19]
Heller

[11] 3,887,267
[45] June 3, 1975

[54] APPARATUS FOR ADJUSTING AN OPTICAL OBSERVATION DEVICE

[75] Inventor: Rudolf Heller, Zurich, Switzerland

[73] Assignee: Contraves AG, Zurich, Switzerland

[22] Filed: June 3, 1974

[21] Appl. No.: 475,859

[30] Foreign Application Priority Data
June 18, 1973 Switzerland.......................... 8852/73

[52] U.S. Cl. ................................................. 350/85
[51] Int. Cl. ............................................ G02b 21/24
[58] Field of Search ................................ 350/81-85

[56] References Cited
UNITED STATES PATENTS

| | | | |
|---|---|---|---|
| 3,566,872 | 3/1971 | Draeger | 350/85 |
| 3,809,454 | 5/1974 | Brambring | 350/84 |

FOREIGN PATENTS OR APPLICATIONS

| | | | |
|---|---|---|---|
| 1,901,180 | 11/1969 | Germany | 350/85 |
| 2,161,396 | 7/1972 | Germany | 350/85 |

Primary Examiner—Ronald J. Stern
Assistant Examiner—Jon W. Henry
Attorney, Agent, or Firm—Werner W. Kleeman

[57] ABSTRACT

An apparatus for adjusting an optical observation device supported via a carrier on support component at a stand and which is freely movable by means of a rod in a horizontal plane and adjustable in vertical direction by means of an adjustment motor, the direction of running of which is governed by a reversing switch which can be actuated by an adjustment element. At the switching circuit of the adjustment motor there is provided a preselection switch for switching-on and switching-off the adjustment motor, this preselection switch is connected in series with the reversing switch. At the adjustment element, the one end portion of which is constructed as a mouthpiece intended to be engaged by the mouth of the operator and equipped with two mouthpiece portions which can be bitten together against restoring forces, there is arranged a coupling element which, for the purpose of actuating the reversing switch, is movable in a vertical plane which is fixed with respect to the carrier component.

2 Claims, 2 Drawing Figures

APPARATUS FOR ADJUSTING AN OPTICAL OBSERVATION DEVICE

BACKGROUND OF THE INVENTION

The present invention relates to a new and improved construction of apparatus for adjusting an optical observation device or instrument, in particular a binocular microscope.

Such type apparatus is advantageously employed when performing delicate work of the type wherein the operator must observe the working area under intense magnification and from different viewing or sighting directions, such as, for instance, when processing or mounting precision optical or electronic components, or when performing surgical operations, especially surgery involving the brain or eyes. When performing such work it is necessary to be able to adjust the observation device, for instance a binocular microscope, into selected positions or orientations with respect to every localized area or point whithin a certain spatial region and to fix the thus adjusted observation device in desired position after reaching the same.

There are known to the art apparatuses which strive to fulfill these purposes. Thus, for instance, in Swiss Pat. No. 526,069 there has been disclosed a binocular microscope which is secured at a stand in a manner to possess the required degree of freedom of movement, both rotationally and translatory, by actuating a handgrip. This prior art patent also teaches the provision of a switch at the handgrip, so that upon actuating such switch it is possible to eliminate electromagnetic blocking of the stand pivot means in order to be able to adjust the observation device, whereas when the switch is not actuated, the stand pivot means remains blocked in order to prevent any undesired adjustment or setting movement under the influence of the force of gravity or other forces, for instance due to contact or impact against the device by the operator.

It is also known to the art, both from the aforementioned Swiss Pat. No. 526,069 and German Pat. No. 939,348, to compensate the gravitational rotational moments of all components of the stand and the observation device with respect to individual ones or all of the hinges or pivots of the stand by means of balancing or compensation weights, so that even in the unblocked state of such hinges the force of gravity does not cause resetting or readjustment of the binocular microscope.

Such devices which can be adjusted by actuating a handgrip are associated with the decisive drawback that the operator, for such actuation, must at least have one hand free and use the same for such purposes. Hence, the operator must not only interrupt his work activity, but also change his body position, something which is disadvantageous when performing delicate manipulations or work, such as surgical operations.

Furthermore, it is known for instance from Swiss Pat. No. 482,439 to adjust a binocular microscope which is secured at a stand with the necessary degrees of freedom of rotational and translatory movement, by actuating switches arranged at a head support. These switches control the starting-up or stopping of electrical adjustment or setting motors which, in turn, initiate or block, as the case may be, the movement of the binocular microscope.

In U.S. Pat. Nos. 2,967,458 and 3,475,075 there is taught using, in place of the above-mentioned electrical adjustment or setting motors, hydraulic or pneumatically operated adjustment motors. The control of the adjustment motors is disclosed as occurring merely by using the foot of the operator.

Such type equipment which can be adjusted by actuating head supports or foot or pedal switches do not permit of any exact adjustment of the observation device in a desired position and/or orientation, since it is impossible to obtain either with the use of the head or the foot of an operator the same movement accuracy as when using his hand. Moreover, an additional inaccuracy factor is attributable to the fact that when a pressure is to be exerted by the head or the foot upon a switch, the skin with respect to the skull and the foot with respect to the shoe carry out uncontrolled movements.

In German Patent Publication No. 2,161,396, there is taught an apparatus which overcomes the aforementioned drawback in that adjustment of the observation device occurs by means of a mouthpiece equipped with a switch which can be actuated by a biting action for the purpose of releasing the electromagnetic blocking of the hinges or pivots of the support or stand. After successfully releasing the blocking action the observation device can be adjusted by the operator by means of the mouthpiece retained between his teeth, through appropriate head movements.

However, since a mouthpiece which is held between the teeth only can transmit relatively low forces or rotational moments, the use of the apparatus described in such German Patent Publication No. 2,161,396 is limited to such stands where the gravitational moments of all components, related to all of the hinges, are compensated by balancing weights. When using an embodiment of support which is simplified in construction for economical reasons, wherein compensation of the gravitational moments is not undertaken with regard to all of the hinges or pivots, the danger is present that adjustment of the observation device by means of a mouthpiece can endanger the operator, apart from the fact that such activity may over exert his muscle efforts.

In German Patent Publication No. 1,220,630 there is taught apparatus wherein a steoeoscopic observation microscope is supported at a stand in a manner that it can be freely moved in horizontal direction with respect to a stationary socket and is adjustable in vertical direction with the aid of an adjustment motor. For the purpose of controlling the direction of running of the adjustment motor there is employed a reversing switch which is actuated by means of a protection element arranged at the microscope, by rotating or tilting such protection element. Such apparatus is associated with the previously mentioned drawback so that the operator, for the purpose of controlling the adjustment motor, must free and use at least one hand.

SUMMARY OF THE INVENTION

The invention of this development is especially concerned with such type apparatus for adjusting an optical observation device which is supported at a stand by means of a support or carrier component, and which is freely movable by means of a rod in a horizontal plane and by means of an adjustment motor, the direction of travel of which can be determined by a reversing switch which can be actuated by an adjustment element, can be adjusted in vertical direction.

It is a primary object of the present invention to afford the operator, when using a simple support of the above type, to exactly carry out horizontal and vertical adjustment movements of the observation device, without the need to expend considerable force and without having to use the hands and/or the feet.

Another important object of the present invention aims at a new and improved construction of apparatus for adjusting an optical observation device, and which apparatus is relatively simple in construction and design, extremely reliable and accurate in operation, not readily subject to breakdown, and requires a minimum of servicing and maintenance.

Now in order to implement these and still further objects of the invention, which will become more readily apparent as the description proceeds, the invention contemplates arranging in the switching circuit of the adjustment motor a preselector switch for turning-on and turning-off the adjustment motor, the preselector switch being connected in a series circuit arrangement with the reversing switch. Furthermore, at the adjustment element, the one end portion of which is constructed in conventional manner as a mouthpiece intended to be engaged by the bite of the operator and equipped with two mouthpiece portions which can be bitten together against restoring forces and which actuate the preselector switch, there is arranged a coupling element which, for the purpose of actuating the reversing switch, is movable in a vertical plane which is fixed with respect to the support or carrier component of the device.

According to a first exemplary embodiment of the invention the observation device is supported at the device support or carrier component through the agency of a tiltable or pivotable bearing having a horizontal axis, the reversing switch is secured to the observation device, and the coupling element is constructed as a lever arm and movable in a bearing having a horizontal axis and mounted at the observation device. Advantageously, the movement of the adjustment element is limited by two stops at a minimum value required for the actuation of a sensitive reversing switch. The axis of the bearing for the tiltable or pivotable motion of the observation device is situated almost parallel or also coaxially with respect to the axis of the bearing for the movement of the adjustment element, and both the moment of inertia as well as the frictional moment to be overcome are much smaller for the movement of the adjustment element than for the tilting of the observation device, and which can be realized in conventional manner. In this way there is ensured that the exertion of a force, which can bring about both a movement of the adjustment element as well as a tilting movement of the observation device, initially causes a movement of the adjustment element and only thereafter a tilting of the observation device.

According to the first exemplary embodiment of apparatus designed according to the teachings of this development there is attained the result that the operator, with the aid of the adjustment element, can freely move the observation device in a given horizontal plane, i.e., can freely rotate the observation device about different vertical axes and can pivot the same at the stand. This can be accomplished quite effortlessly if the relevant hinges or pivots of the stand functions in a relatively frictionless manner. If the operator exerts a force in vertical direction upon the adjustment element without actuating the preselection switch by biting down on the mouthpiece, then initially the adjustment element moves slightly about the axis of its bearing until reaching a stop, and thereafter there prevails at the stand a rotational moment about the tilting or pivot axis of the observation device, since the adjustment motor is stationary and the stand does not give in vertical direction. Consequently, the observation device carries out a corresponding tilting or pivoting movement. Now if the operator exerts a force in vertical direction upon the adjustment element and at the same time actuates the preselection switch by means of the mouthpiece, then the adjustment or setting motor has delivered thereto a current corresponding to the position of the reversing switch, the stand raises or lowers for such length of time as the preselection switch is actuated, and there is not precluded that the operator of the observation device, can simultaneously carry out a tilting movement if he leads the vertical movement of the stand with the adjustment element.

In this manner there is solved by means of the inventive apparatus the problem of separating between the vertical force components on the one hand for the tilting movement and, on the other hand, for the elevational adjustment, as well as the problem of exerting the required force for the lifting or braking during lowering of the observation device.

There are however manipulations on the part of the operator which do not require any frequent adjustment or setting of the observation device about its tilting or pivot axis. Thus, experience has shown that, for instance, tilting movements of the binocular microscope are not required by a surgeon during the course of certain brain surgery, and therefore it is clearly acceptable to have him carry such out manually. If there is dispensed with the control of the tilting movement of the observation device by means of the mouthpiece, then there is realized a second exemplary embodiment of inventive apparatus, which combines the advantage of a less expensive construction with the further advantage that the vertical movement of the stand and the observation device is exclusively controlled by a vertically oriented force, which of course is most compatible to the natural reflexes of the operator.

According to the second exemplary embodiment of inventive apparatus the reversing switch is secured to the device support component of the stand, and the coupling element of the adjustment device is constructed as a vertical slide which slides at the device support component.

Advantageously the movement of the adjustment element is limited to a minimum value required for the actuation of a sensitive reversing switch by means of two stops. Since in the aforediscussed second exemplary embodiment of the inventive apparatus there is no relationship between the movements of the adjustment element and the tilting movements of the observation device, the stops completely limit the vertical movement of the adjustment element and the operator thus has the possibility, by means of the mouthpiece, to sense the elevational adjustment or positioning of the device support component and its movement in the elevational direction.

With the inventive apparatus according to the second proposed exemplary embodiment there is achieved the result that the operator, with the aid of the adjustment element, can freely move the observation device in a horizontal plane just as was the case with the first-mentioned embodiment of this invention. If the operator exerts a force in vertical direction upon the adjustment element, without actuating the preselection switch by biting down on the mouthpiece, then there does not occur any movement of the stand or support or the observation device, and the operator feels the resistance of the stop. If the operator now actuates the preselection switch by biting down on the mouthpiece, then the adjustment motor, just as was the case for the first-mentioned embodiment, receives a current corresponding to the position of the reversing switch, the stand raises or lowers as long as the preselection switch is activated, and the operator senses the movement of the stand by virtue of the resistance of the mouthpiece. The combination of a preselection switch and a reversing switch as contemplated by the inventive apparatus prevents the unintentional vertical adjustment of the stand by simply contacting or touching the adjustment element. A precise adjustment in particular requires a very sensitive reversing switch, which responds to very small movements of the adjustment element, and with the desired sensitivity there are avoided unintentional reactions in that a preselection switch controls the current circuit of the adjustment motor.

In this way with the inventive apparatus there is solved the problem of generating the requisite force which must be applied for the lifting or braking during lowering of the observation device as well as the problem of the exact adaptation between the movement direction of the observation device and the direction of force which brings about such movement.

The adjustment motor which controls the upward and downward movement of the stand or support, can be preferably electrically controlled and driven, however it is equally possible to use fluidic operating systems, especially hydraulic or pneumatic drives or controls. The preselection switch and the reversing switch may be appropriately designed as electrical switches or switching elements, as fluidic switching elements or as hydraulic or pneumatic valves.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
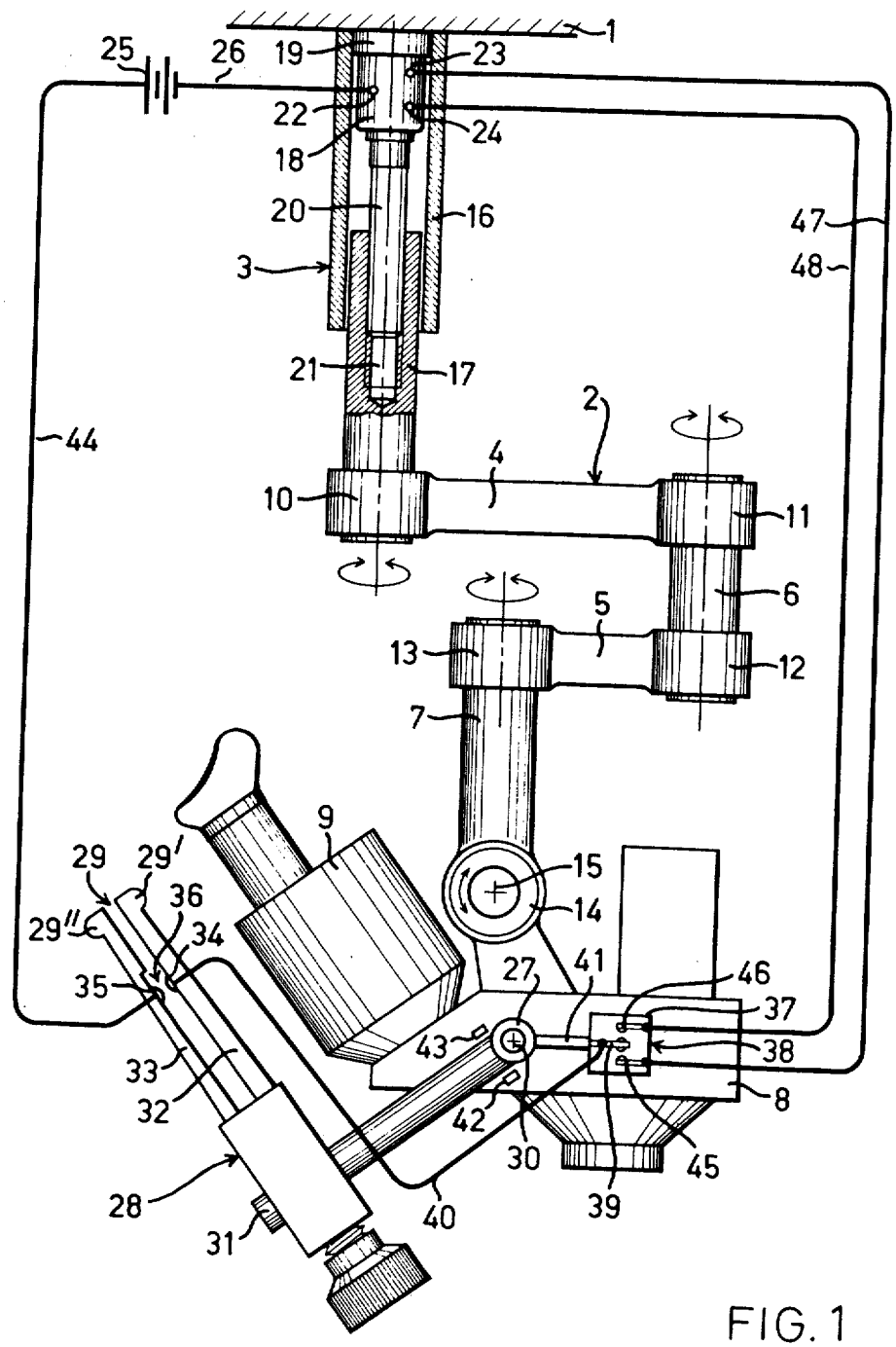
FIG. 1 is a schematic illustration, partly in sectional view, of a first exemplary embodiment of apparatus for the adjustment of an observation device, here shown as a binocular microscope, at a stand or support.

Describing now the drawings, in the exemplary embodiment of apparatus for the adjustment of an optical observation device, typically a binocular microscope by way of example, as shown in FIG. 1, a socket or base 1 is secured, for instance to the ceiling of a room. At the socket 1 there is fastened in any convenient manner a support or stand, generally designated in its entirety by reference character 2. This stand 2 consists of a vertical, telescopically adjustable column means 3, two pivotable arms or arm members 4 and 5, a substantially vertical pivot pin 6 and a device or instrument carrier or support component 7. At the carrier component or portion 7 there is supported a housing 8 of a binocular microscope 9 constituting the observation device or instrument. The pivotal arms 4 and 5 are articulated with the column arrangement or means 3 and with the rotary or pivot pin 6 and the device carrier or support component 7 and therefore pivotable in a horizontal plane, through the agency of friction-poor, i.e., low friction bearings 10, 11, 12 and 13, these bearings or bearing means having axes which extend substantially vertically, as shown. The housing 8 is connected through the agency of a low friction bearing or bearing means 14, having a substantially horizontal extending axis, with the device carrier component 7 and thus can be tilted in vertical planes about the horizontal axis 15 of the bearing 14.

The telescopically adjustable column means 3 consists of a substantially vertical extending outer external tubing 16 and an inner component 17 which slides within the outer tubing or pipe 16 and is secured against rotation in any conventional way. In the outer tubing 16 and at the socket or base 1 there is attached an adjustment or setting motor 18 by means of a support or holder 19. The drive or output shaft of the adjustment motor 18 is constructed as a threaded rod or spindle 20 which is threaded into a threaded bore 21 of the inner slidable component 17, so that the adjustment motor 18, depending upon its direction of rotation, tends to upwardly or downwardly adjust the inner component 17, resulting in the binocular microscope 9 being raised or lowered as the case may be.

The adjustment motor 18 is a conventional electric motor having two directions of rotation, i.e., running directions, the rotor of such motor is arrested or blocked when no current is delivered thereto and the stator windings of which are accessible via the connections or terminals 22, 23 and 24. The terminal 22 constitutes a common terminal for both directions of rotation of the adjustment motor 18 and the terminals 23 and 24 are respectively associated with a given direction of rotation of the adjustment motor. The drive current for the adjustment motor 18 is supplied by a suitable current source 25, e.g., battery which is operatively coupled via a conductor 26 with the terminal or connection 22.

At the housing 8 the binocular microscope 9 is mounted by means of a low friction bearing arrangement or means 27 at an adjustment element, conveniently designated in its entirety by reference character 28. The end portion of the adjustment element 28 is constructed as a mouthpiece 29. The axis 30 of the bearing 27 extends substantially horizontally and parallel to the axis 15 of the bearing means 14. A lever arm 31 of the adjustment element 28 is adjustable and can be fixed in any suitable desired position, so that the mouthpiece 29 and the ocular of the binocular microscope 9 can be mutually brought into a position where, when an operator looks into the binocular microscope 9, the mouthpiece 29 is in a position where it can be grasped by the mouth of the operator.

Electrical contacts 34 and 35 which are employed as switch components are arranged between two resilient mouthpiece components or parts 32 and 33 which can be bitten together against the action of a resilient restoring force. The electrical contacts 34 and 35 form a preselector or preselection switch, designated conveniently in its entirety by reference numeral 36.

At the housing 8 there is additionally secured the housing 37 of an electrical reversing switch 38. The switching or reversible contact 39 of the reversing switch 38 is electrically coupled through the agency of a conductor or line 40 with one contact 34 of the preselector switch 36 and is mechanically actuated by means of a coupling element 41 constructed as a lever arm from the location of the adjustment element 28, in that the lever arm 41 is force-lockingly or positively connected with the lever arm 31 and thus there is transmitted to the switching or reversing contact 39 rotations of the mouthpiece 29 about the axis 30 of the bearing means 27. Stops 42 and 43 limit the rotational extent, i.e., the degree of rotation of the lever arm 31 about the axis 30 to a minimum value required for the faultless actuation of the reversing switch 38.

The other contact 35 of the preselection switch 36 is electrically coupled through the agency of a conductor or line 44 with the current source 25.

Both of the fixed contacts 45 and 46 of the reversing switch 38 are electrically coupled via conductors or lines 47 and 48 with the terminals 23 and 24 respectively, of the adjustment or setting motor 18. Hence, the current circuit from the current source or supply 25 extends via the preselection switch 36 to the reversing switch 38 and thereafter, depending upon the position of the reversing switch 38, either via the contact 45 of the reversing switch 38 and the conductor 47 to the terminal 23 of the adjustment motor 18 or via the contact 46 of such reversing switch 38 and the conductor 48 to the terminal or connection 24 of the adjustment motor 18, the current circuit from the terminal 22 of the adjustment motor 18 leading back to the current source 25 through the agency of the conductor or line 26.

The directions of rotation or running of the adjustment motor 18 associated with the terminals 23 and 24 are selected such that with the preselection switch 36 closed, a rotational moment exerted upwardly upon the mouthpiece 29 about the axis 30 controls the direction of rotation, i.e., the operation of the adjustment motor 18 such that it brings about lifting of the instrument carrier or support component 7 and the binocular microscope 9, and a rotational moment directed downwardly at the mouthpiece 29 brings about lowering of the instrument support component 7 and the binocular microscope 9.

The arrangement of the binocular microscope 9 and all components which are secured at the housing 8 thereof and which together with such housing 8 can carry out a tilting or pivoting movement about the horizontal axis 15 is carried out in a conventional manner such that all of the gravitational moments, related to the axis 15, are exactly balanced or compensated. Notwithstanding the use of low friction bearings the binocular microscope and the components mounted thereat do not carry out any spontaneous tilting movements under the influence of the force of gravity, and the resultant structure remains positionally stable in any random adjusted tilted position.

The inventive apparatus for adjusting the observation instrument or device, the binocular microscope in this case, in the embodiment described above with regard to FIG. 1, is used by the operator in the following manner:

The operator initially adjusts the adjustment element 28 with respect to the ocular of the binocular microscope 9 such that it is possible for him to grasp the mouthpiece 29 between his teeth and to bite the same, i.e., clamp the mouthpiece between the teeth during such time as he is looking through such binocular microscope.

For carrying out a movement of the binocular microscope in a horizontal plane the operator seizes the mouthpiece 29 bewteen his teeth, without exerting sufficient biting force that the electrical contacts 34 and 35 will come into contact with one another and thus close the preselection switch 36. Consequently, the adjustment or setting motor 18 does not have any current delivered thereto, and the stand will not carry out any vertical movements. Then the operator exerts a horizontal force in the desired direction upon the mouthpiece, whereafter the pivotal arms 4 and 5 of the stand or support 2 carry out corresponding pivotal movements about their low friction bearings and the binocular microscope 9 carries out a corresponding rotational movement about vertical axes about the low friction bearing 13 of the instrument carrier or support component 7. The movements of the pivotal arms and the binocular microscope conjointly act so as to bring about the desired adjustment or setting.

To carry out a tilting or pivoting movement of the binocular microscope 9 the operator seizes the mouthpiece 29 between his teeth, again without exerting any biting force, so that also again in this case the adjustment or setting motor 18 does not have any current delivered thereto. Then the operator exerts an approximately vertically directed force upon the mouthpiece, resulting in a rotational moment relative to the axis 15, the mouthpiece then being slightly rotated in the direction of the force about the axis 30 of the associated low friction bearing 27 up to the stop and then the binocular microscope carries out the desired tilting or pivoting movement.

Owing to the low moment of inertia of the entire adjustment element 28 with regard to the axis or shaft 30, in comparison to the much greater moment of inertia of the binocular microscope 9 with respect to the axis or shaft 15, there initially occurs a rotation of the mouthpiece 29 about the axis 30, and only then a rotation of the binocular microscope about the axis 15 provided that the associated bearings are sufficiently low in friction or the friction in the bearing 14 is greater than the friction in the bearing 27. The last-mentioned characteristic can be positively realized in conventional manner, for instance by employing adjustable braking devices, which have not been particularly shown in FIG. 1 in order to preserve the clarity of the illustration.

In order to carry out an elevational adjustment of the binocular microscope 9 the operator grasps the mouthpiece 29 between his teeth and exerts a biting action, with the result that the preselection switch 36 is closed. The stand or support 2 is placed into movement, in that the column means 3, depending upon the position of the reversing switch 38, is telescopically retracted or extended by the adjustment or setting motor 18. If the operator maintains the mouthpiece at constant height, then the stand alternately carries out slight up and down movements, while the lever arm 31 oscillates about the axis or shaft 30 between the stops 42 and 43. This oscillation is basically not disadvantageous since it immediately ceases when the biting action on the mouthpiece is released. If the operator exactly follows the vertical movement of the stand with the mouthpiece, then this movement is continued until the operator again holds the mouthpiece at a constant height or until he releases the biting action thereon. If the operator leads the vertical movement of the stand or support with the mouthpiece, then there additionally exists a tilting or pivoting movement of the binocular microscope. Finally, if the operator moves the mouthpiece in vertical direction more slowly than the stand raises or lowers, then the moments of inertia of the adjustment element and the binocular microscope as well as the frictional characteristics of the corresponding horizontal bearings 14 and 27 act such that there do not occur any tilting movements of the binocular microscope, simply vertical oscillations of the stand or support, the average value of which results in a slower raising or lowering of the stand or support in contrast to the constant movement.

Simultaneous with the described tilting movements and the elevational adjustments the operator, at any instant in time, can adjust the observation device in horizontal plane, since the horizontal movements do not interfere with the tilting movements and the vertical movements.

The schematically illustrated bearings 14 and 27 depicted in FIG. 1 and having essentially parallel axes 15 and 30 and which are shown, by way of example, in spaced relationship from one another, also can be coaxially arranged.

Figure 2:
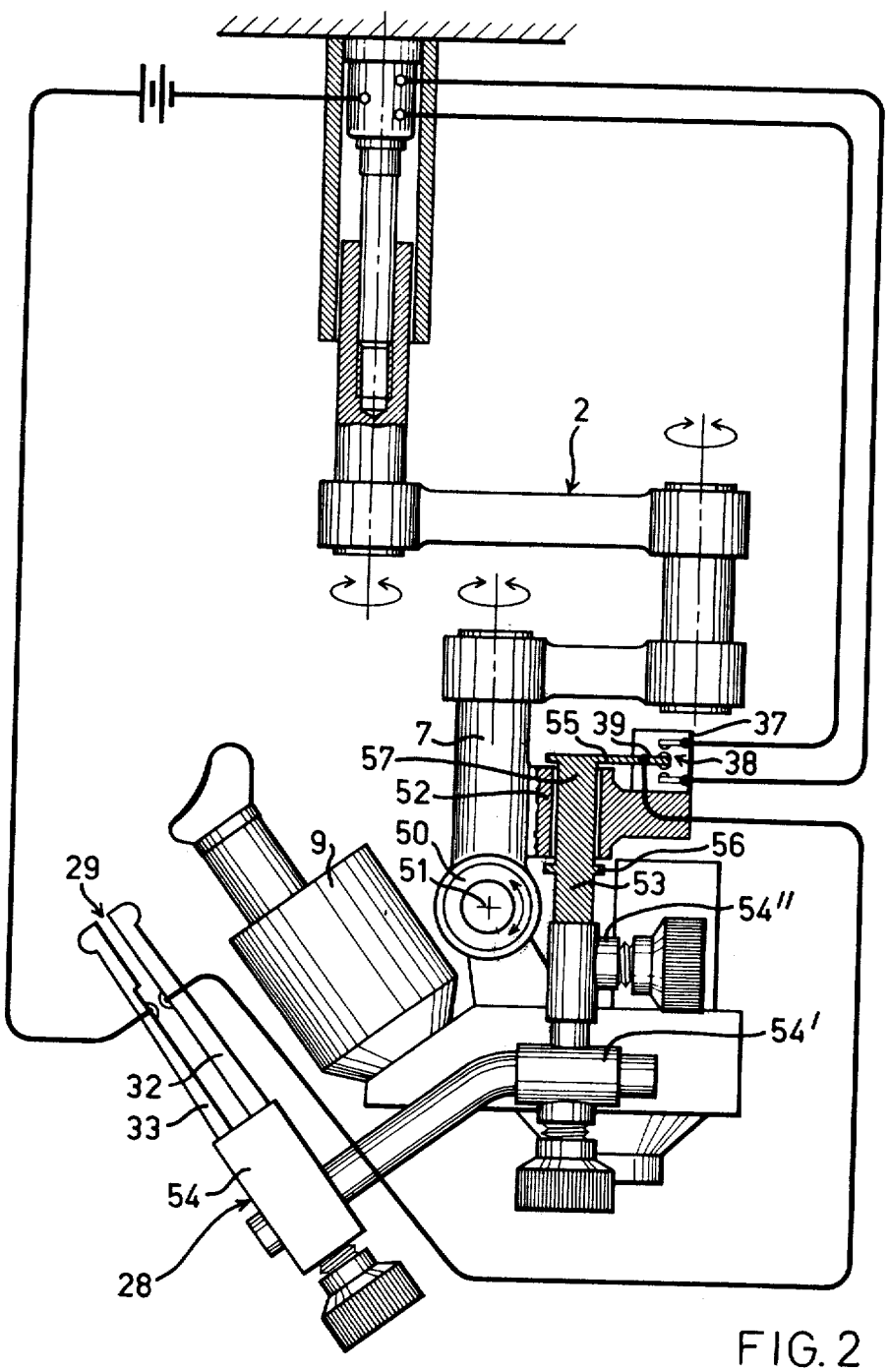
FIG. 2 is a schematic illustration, again partially in sectional view, similar to the showing of FIG. 1, of a simplified embodiment of inventive apparatus.

Continuing, in the modified exemplary embodiment of FIG. 2 there is shown a simplified version of the inventive apparatus, the use of which is particularly advantageous if the activity of the operator does not require any frequent adjustment of the binocular microscope about its tilting or pivot axis, and when it is acceptable for the operator to manually perform such tilting movements.

For this purpose the binocular microscope 9, which is secured to the stand or support 2, is operatively connected with the device carrier or support component 7 by means of a bearing 50, the movements of which can be arrested or blocked in conventional manner. The tilting movements of the binocular microscope 9 about the axis or shaft 51 of the bearing 50 are manually carried out after releasing the blocking action, and the bearing 50 then again can be manually blocked or arrested.

The instrument carrier component 7 carries in a force-locking or positive manner a fixture 52 for a coupling element constructed as a slide 53 and with which there is connected the adjustment element 28. The adjustment element 28 is equipped with a holder arrangement or means 54, 54', 54" which can be adjusted in conventional manner and permits the mouthpiece 29 to be adjusted in desired position relative to the carrier component 7 and the binocular microscope 9.

The fixture 52 is intended to cooperate with the slide 53 in such a way that there is not possible any movement other than a slight vertical movement of the slide 53 relative to the instrument carrier component 7, this vertical movement being limited by two stops 55 and 56. For this purpose the component 57 of the slide 53 which cooperates with the fixture 52 can possess a suitable cross-sectional configuration, typically a polygonal configuration, for instance triangular or square cross-sectional configuration, and the fixture 52 can be constructed as a sliding or sleeve bearing accommodated thereto. The fixture 52 and the component 57 of the slide 53 which cooperates therewith also can be constituted, for instance, by means of a dovetail connection.

The housing 37 of the electric reversing switch 38 is secured at the carrier component 7, i.e., at the fixture 52 which is positively connected with the carrier component 7. The reversing or switching contact 39 of the reversing switch 38 is mechanically positively connected with the slide 53, for instance by making use of the stop 55. In this way a vertical movement of the adjustment element 28 with the mouthpiece 29 is transmitted to the switching contact 39, the stops 55 and 56 limiting the movement of the adjustment element 29 to the minimum value required for the faultless actuation of the reversing switch 38. The reversing switch 38 is electrically connected with a current circuit which is identical to the current circuit described in conjunction with the arrangement in FIG. 1, and thus need not be here further considered.

The inventive apparatus for adjusting the support or stand of a binocular microscope which has been described in conjunction with the simplified embodiment of apparatus shown in FIG. 2 is used by the operator in the following manner:

The operator initially adjusts the binocular microscope 9 into the desired tilted position. Thereafter, the operator positions the adjustment element 28 relative to the ocular of the binocular microscope 9 such that he can seize between his teeth the mouthpiece 29 and bite thereon when desired, and particularly during such time as he is looking through the binocular microscope.

To carry out movements of the binocular microscope in a horizontal plane and/or for carrying out an elevational adjustment the operator proceeds in the manner previously described in conjunction with the embodiment of FIG. 1. Tilting movements of the binocular microscope must be carried out manually, whereafter, if necessary, the position of the mouthpiece again can be readjusted.

The purpose of the inventive apparatus for the adjustment of an optical observation instrument or device, and the notable advantage in contrast to the heretofore known equipment, resides in the fact that the operator feels and adjusts the observation device as if he were wearing eye glasses. His head movements are followed without any effort and precisely by the instrument, and the desired adjustment occurs by the operator carrying out natural movements. To adjust the stand and the observation device it is especially unnecessary for the operator to perform any mental decisions as to which control is to be actuated in order to bring about a desired movement.

By virtue of the previously discussed advantages of the equipment of this development it is possible to dispense with the need for the operator to carry out many body and mental efforts, and thus he can concentrate his attention almost entirely upon his working activity, thereby equally accelerating the speed with which he is able to carry out such work. In the event that the device is used for surgical operations the length of the operation is considerably shortened, advantageously reducing the time during which the patient must be exposed to anesthetics, again equally beneficially resulting in a very important reduction in the shock reaction of the patient to the operation. These advantages which can be realized when using the different constructions of apparatus according to the invention are to be particularly mentioned as notable advantages from the ethical standpoint.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for adjusting an optical observation instrument, comprising:

an optical observation instrument having a housing, a stand including an instrument support component, means for freely moving the support component in a substantially horizontal plane, adjustment motor means having two directions of movement for respectively adjusting the support component in vertical direction upwards and downwards, bearing means having a substantially horizontally extending axis and supporting the housing of the instrument at the support component, a preselection switch means incorporating two electrical contact pieces and having one closed-contact and one opened-contact position, a reversing switch means incorporating one reversing electrical contact piece and two static electrical contact pieces and having two closed-contact positions of the reversing contact piece respectively with the one and the other static contact piece, the reversing switch means further incorporating a coupling element for mechanical actuation of the reversing contact piece and a housing rigidly secured to the housing of the instrument, a switching circuit for energizing the motor means including the preselection switch means for turning-on and turning-off the motor means, each closed-contact position of the reversing switch means controlling one respective direction of movement of the motor means, the reversing contact of the reversing switch means being electrically connected to one contact of the preselection switch, an adjustment element incorporating a lever arm rigidly connected to the coupling element and an end part constructed as a mouthpiece having two portions each rigidly connected to one respective contact of the preselection switch means and movable to approach each other against a restoring force when bitten together by an operator thereby to actuate the preselection switch means to the closed-contact position, and pivot means having a substantially horizontally extending axis and supporting the adjustment element at the instrument housing while permitting pivotal movement of the adjustment element and of the coupling element connected thereto for actuating the reversing switch means to one of two closed-contact positions.

2. An apparatus for adjusting an optical observation instrument, comprising:

an optical observation instrument having a housing, a stand including an instrument support component rigidly carrying a fixture part, means for freely moving the support component in a substantially horizontal plane, adjustment motor means having two directions of movement for respectively adjusting the support component in vertical direction upwards and downwards, bearing means having a substantially horizontally extending axis and supporting the housing of the instrument at the support component, a preselection switch means incorporating two electrical contact pieces and having one closed-contact and one opened-contact position, a reversing switch means incorporating one reversing electrical contact piece and two static electrical contact pieces and having two closed-contact positions of the reversing contact piece respectively with the one and the other static contact piece, the reversing switch means further incorporating a coupling element for mechanical actuation of the reversing contact piece and a housing rigidly secured to the fixture part of the support component, a switching circuit for energizing the motor means including the preselection switch means for turning-on and turning-off the motor means, each closed-contact position of the reversing switch means controlling one respective direction of movement of the motor means, the reversing contact of the reversing switch means being electrically connected to one contact of the preselection switch means, an adjustment element incorporating a lever arm adjustably connected to a slide means which in turn is rigidly connected to the coupling element and an end part constructed as a mouthpiece having two portions each rigidly connected to one respective contact of the preselection switch means and movable to approach each other against a restoring force when bitten together by an operator thereby to actuate the preselection switch means to the closed-contact position, and a slideway means cooperating with the slide means to provide therefore a sliding movement in a substantially vertically extending direction, thereby permitting the same movement of the adjustment element and of the coupling element both connected thereto for actuating the reversing switch means to one of two closed-contact positions.

* * * * *